United States Patent
McDonald et al.

(10) Patent No.: US 8,874,274 B2
(45) Date of Patent: Oct. 28, 2014

(54) CRYOPUMP NETWORK

(75) Inventors: Randall J. McDonald, Franklin, MA (US); Oliver J. Dumas, East Sandwich, MA (US); Robert P. Sullivan, Wilmington, MA (US); John J. Varone, Seekonk, MA (US); Joseph Chopy, Jr., Cumberland, RI (US); Daniel R. Jankins, Raynham, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 697 days.

(21) Appl. No.: 12/864,142

(22) PCT Filed: Jan. 22, 2009

(86) PCT No.: PCT/US2009/000409
§ 371 (c)(1),
(2), (4) Date: Oct. 14, 2010

(87) PCT Pub. No.: WO2009/094162
PCT Pub. Date: Jul. 30, 2009

(65) Prior Publication Data
US 2011/0016891 A1    Jan. 27, 2011

Related U.S. Application Data

(60) Provisional application No. 61/011,819, filed on Jan. 22, 2008.

(51) Int. Cl.
*G05D 7/00* (2006.01)
*G05B 19/18* (2006.01)
*H04L 12/403* (2006.01)
*G05B 9/02* (2006.01)

(52) U.S. Cl.
CPC ............... *H04L 12/403* (2013.01); *G05B 9/02* (2013.01)

USPC ................................. 700/282; 700/3; 62/55.5

(58) Field of Classification Search
None
See application file for complete search history.

(56) References Cited

U.S. PATENT DOCUMENTS

| 6,061,600 | A * | 5/2000 | Ying ................................. 700/3 |
| 6,233,948 | B1  | 5/2001 | Morishita |
| 6,272,400 | B1  | 8/2001 | Jankins et al. |

(Continued)

FOREIGN PATENT DOCUMENTS

| EP | 0 754 991 A1 | 1/1997 | |
| WO | WO 00/08396 | * 2/2000 | ............... F25C 5/00 |

OTHER PUBLICATIONS

International Search Report, International Application No. PCT/US2009/000409, date of mailing Jun. 30, 2009.

(Continued)

*Primary Examiner* — Sean Shechtman
(74) *Attorney, Agent, or Firm* — Hamilton, Brook, Smith & Reynolds, P.C.

(57) ABSTRACT

A vacuum network control system includes a plurality of nodes configured for control over operational processes of the system. The plural nodes are configured, in a network ring or other topology, as a selectable master node for controlling the operational processes. Control can be distributed among, and passed between, each of the nodes. Each node on the network monitors adjacent network connectors to detect a fault in the network. In response to a detected fault, a disconnect is mapped to the fault, and the network topology is reconfigured for continued communication among the nodes and with external devices.

21 Claims, 7 Drawing Sheets

(56) References Cited

U.S. PATENT DOCUMENTS

| | | |
|---|---|---|
| 6,671,583 B2 | 12/2003 | Varone et al. |
| 6,810,496 B1 * | 10/2004 | Vittal ............................ 714/57 |
| 6,834,317 B2 * | 12/2004 | Chadwell et al. ............ 710/100 |
| 6,886,107 B2 | 4/2005 | Walsh et al. |
| 2004/0261425 A1 | 12/2004 | Amundsen et al. |
| 2005/0034465 A1 * | 2/2005 | Borchers et al. ............... 62/55.5 |
| 2005/0129535 A1 | 6/2005 | Beyer et al. |
| 2006/0089739 A1 * | 4/2006 | Sherriff et al. .................. 700/99 |
| 2007/0217331 A1 | 9/2007 | Khanna et al. |

OTHER PUBLICATIONS

Written Opinion, International Application No. PCT/US2009/000409, date of mailing Jun. 30, 2009.

The European Search Report for 09704663.5, date of mailing: Mar. 15, 2012 (7 pages).

\* cited by examiner

CRYOPUMP NETWORK

RELATED APPLICATION(S)

This application is the U.S. National Stage of International Application No. PCT/US2009/000409, filed Jan. 22, 2009, which designates the U.S., published in English, and claims the benefit of U.S. Provisional Application No. 61/011,819, filed Jan. 22, 2008. The entire teachings of the above applications are incorporated herein by reference.

BACKGROUND OF THE INVENTION

A cryogenic vacuum system typically includes at least one cryogenic vacuum pump (cryopump) and at least one compressor for supplying compressed helium to the cryopump. The system also often includes other components such as roughing pumps, waterpumps (a single stage cryopump), turbopumps, isolation valves and gauges. Together, these components operate to provide vacuum to a broader system, such as a cluster tool for semiconductor processing.

A cluster tool includes a tool host controller providing top-level control over all systems within the cluster tool. The tool includes a series of processing chambers for performing various semiconductor-fabrication processes such as wafer etching, chemical or plasma vapor deposition, oxidation, sintering, degassing, wafer transfer, and annealing. These processes often are performed in separate chambers, each of which may include a cryopump of the cryogenic vacuum system.

In addition to the cryopumps, a conventional vacuum system typically includes a network interface terminal acts as an interface between the tool host controller and the network of cryopumps within the system. Other vacuum system components, such as a roughing pump, compressor, gauges, waterpump, turbomolecular pump, and gate valve, are typically coupled with the tool host controller to allow the tool host controller to issue commands for controlling the operation of these components.

SUMMARY OF THE INVENTION

Embodiments of the present invention provide a vacuum control network comprising a plurality of nodes, the nodes comprising one or more cryopumps, compressors, other vacuum pumps and associated devices Network ring segments between node pairs form a ring with the plurality of nodes, thereby enabling internode communication via the ring. A network controller, located at one of the nodes or external to the nodes, manages the network such that only a single path connects any two nodes and it also determines whether a fault has occurred at one of the ring segments or in one of the nodes. Based on a detected fault, network ring segments can be enabled and disabled to reconfigure the topology of the network, thereby enabling continued communications among all network nodes.

In further embodiments of the invention, network ring segments may be disabled and enabled independent of the integrity of that network connector, for example by disabling an uncompromised network ring segment connector. In disabling network ring segments, the physical network ring may form a virtual "bus." A previously disabled network ring segment may be enabled in order to carry communications following a fault at another network ring segment or node. Each of the nodes may be configured to monitor and detect errors in adjacent network ring segments and nodes, reporting the errors to a common node or network controller.

In a further embodiment at least one node may be communicatively coupled to a separate vacuum network controller to control vacuum pumps and other components via communications across the vacuum control network. In order to provide additional fault recovery, a redundant signal path may be provided to connect an additional node to the vacuum network controller.

Further redundant protection is achieved in an embodiment that includes redundant communication paths from the vacuum control network to the tool host or a hub or similar device that is connect to the tool host.

In still further embodiments, one or more nodes of the network may include logic (or otherwise be configured) for initiating, controlling and managing operational processes of the vacuum control system, such as helium management, controlling safety interlocks and coordinating group regeneration for cryopumps and rough and purge control for turbomolecular pumps. Each of the nodes may therefore operate as a process master, controlling a set of operational processes among vacuum components locally and at other nodes of the network. Each process master node, therefore, may assume control over a set of processes making up a share of the entirety of processes for operating and managing the vacuum control system. In distributing such functionality, one or more nodes may be configured to coordinate operations at other nodes, for example by controlling or allocating helium supply to or from a node and controlling access to a vacuum manifold for regeneration for a cryopump node. A particular node may be configured to operate as the vacuum network manager, monitoring and controlling operation and configuration of the network.

In another embodiment, a single node may be selected as a "supernode" to control processes at the other nodes. When the supernode, acting as the vacuum system controller, exhibits a fault condition or is removed from the vacuum control network, the control responsibility is passed to another node on the network, being selected as a successive supernode. Similarly, in an embodiment comprising plural process masters, responsibility over a set of operational processes may be passed from a first process master node to a second process master node when the first process master node exhibits a fault or becomes unavailable.

Another embodiment uses the passage of the vacuum network control from one node to another after fault of the controlling node in topologies that include Ethernet ring, star and bus configurations.

An additional embodiment includes redundant connections between the component monitor server and nodes on the vacuum network for added fault tolerance.

Another embodiment includes fault tolerance for a configuration where one or more of the vacuum components is located on one or more different hubs than the remainder of the vacuum components such as a compressor in a subfab. Fault tolerance is achieved through redundant connections for the other items to the different hubs and monitoring and control of the assignments of the communication segments to the hub by the vacuum network controller.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
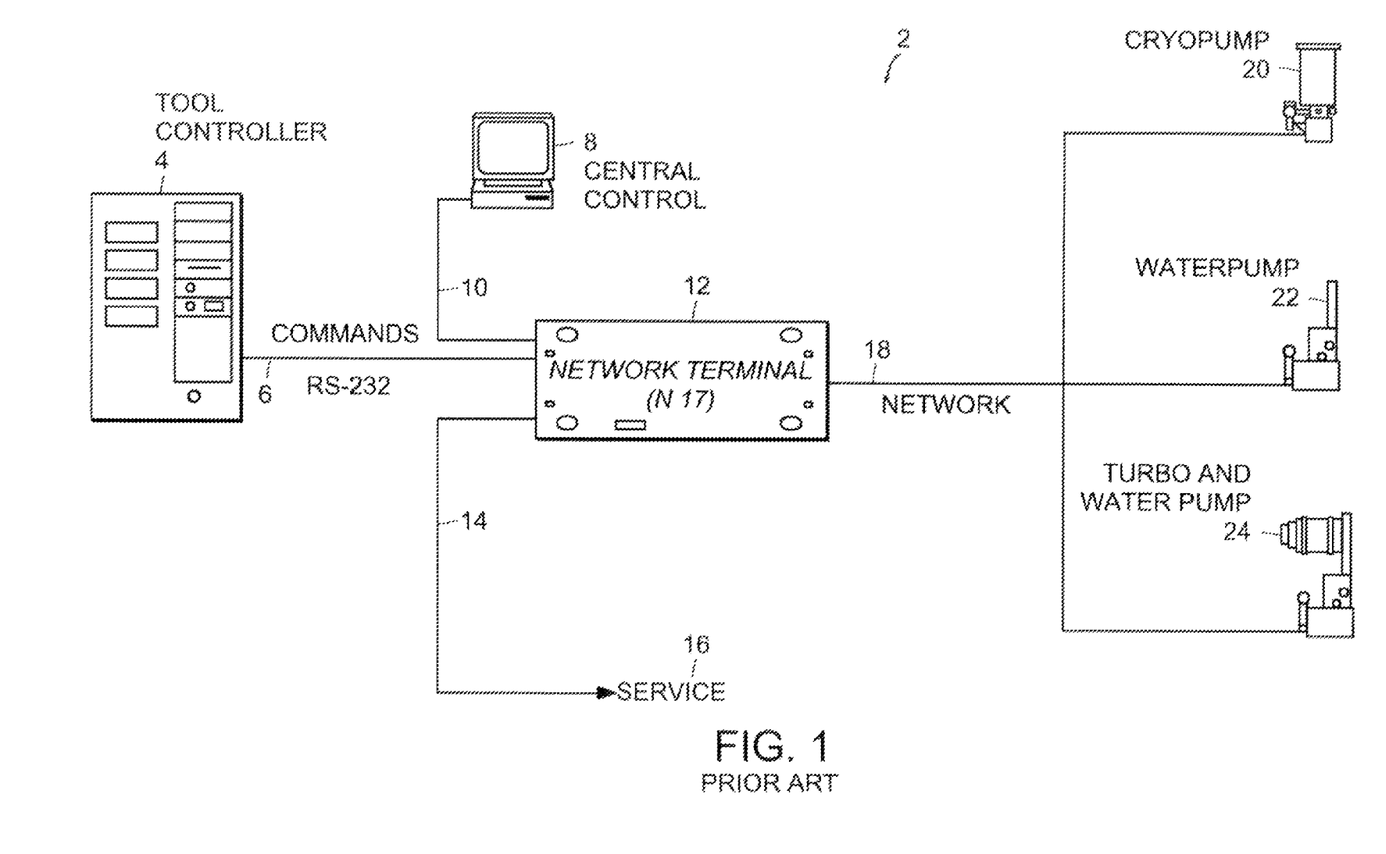
FIG. 1 is a schematic diagram of a system employing a vacuum pump network.

FIG. 1 is a schematic diagram of a typical prior art vacuum system employing a vacuum pump network 18. Example vacuum systems employing such a network are provided in U.S. Pat. No. 6,671,583, entitled "Vacuum System Information Network," which is incorporated by reference herein in its entirety. A network interface terminal (NIT) 12 connects via the network 18 to one or more pumps in a cluster tool. The illustrative system of FIG. 1 comprises various pumps including a cryopump 20, a waterpump 22 and a turbo and water pump combination 24.

In addition, the NIT 12 interfaces with a tool host controller 4 via an RS-232 connection 6. The NIT 12 can also connect to other systems such as a central control station 8 via a central control link 10 and to a service terminal 16 via a service link 14.

The NIT 12 supports only vacuum components that have an appropriate network communications interface. Third-party sensors, which cannot be connected to the NIT 12, must be connected directly to the tool host controller 4, thus placing more burden on the tool host controller 4.

Figure 2:
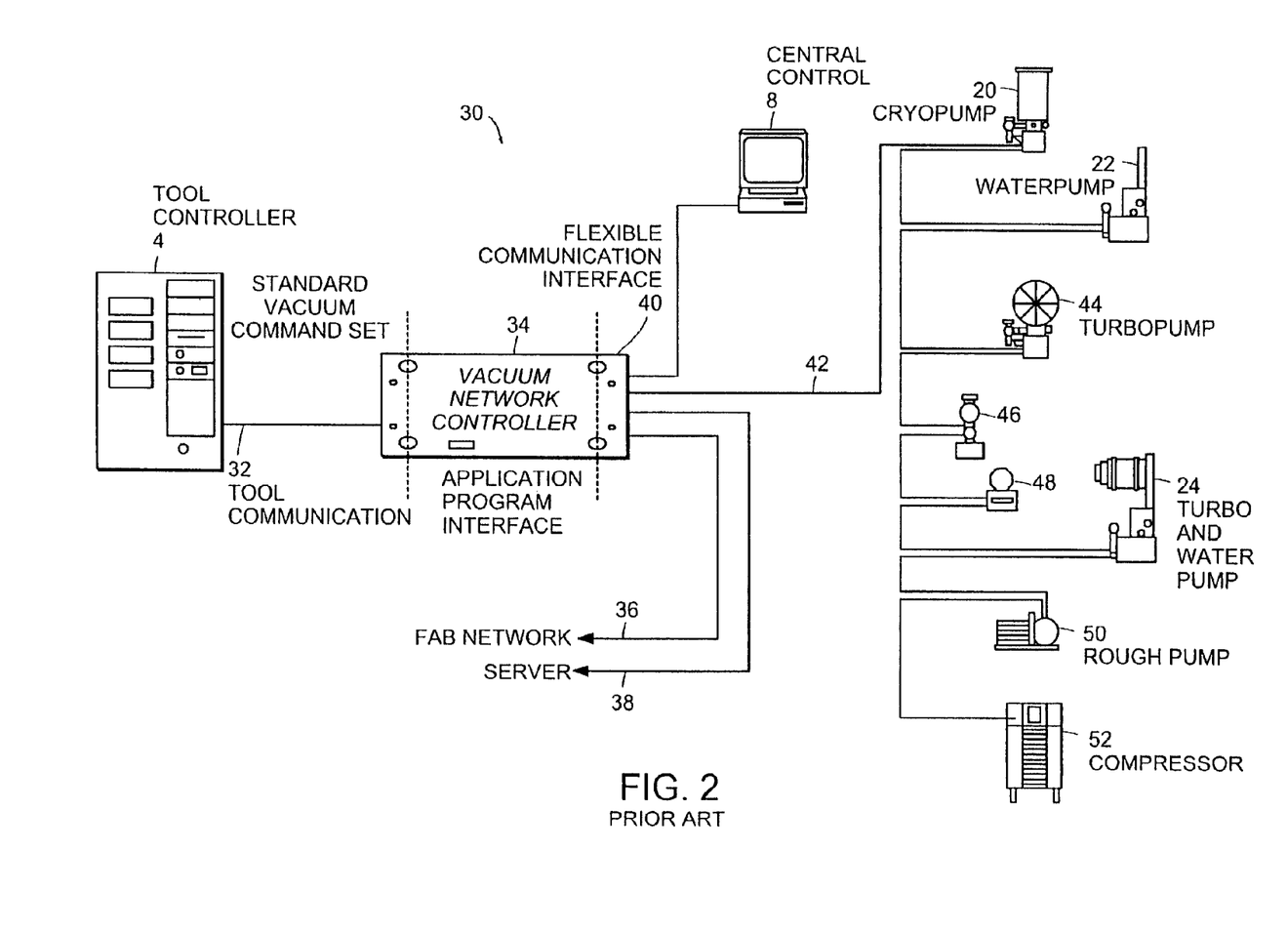
FIG. 2 is a schematic diagram of a system employing a vacuum pump network having a bus configuration.

FIG. 2 is a schematic diagram of a second vacuum system 30 as known in the art. A vacuum network controller (VNC) 34 takes the place of the NIT 12 of FIG. 1. A VNC is described more fully in U.S. Pat. No. 6,272,400, entitled "Vacuum Network Controller," which is incorporated by reference herein in its entirety. The VNC 34 communicates with the tool host controller 4 over a tool communication link 32, which is not limited to just RS-232 as was the connection 6 of FIG. 1. Using a flexible communication interface 40, the VNC 34 communicates with a central control station 8 over any of a variety of protocols. In the illustrative system of FIG. 2, the VNC 34 also interfaces with a fabrication facility network 36 and with a server 38.

The VNC 34 communicates over a daisy-chained serial bus 42 such as a BitBus with a plurality of vacuum pumps 20, 22, 24, 44 and other components such as valves 46, gauges 48, rough pumps 50 and compressors 52. A disadvantage of this system is that to insert a new component into the middle of the bus 42, connections between the bus and components must be broken. In addition, if one component or its connection is faulty all of the equipment ceases control central.

Figure 3:
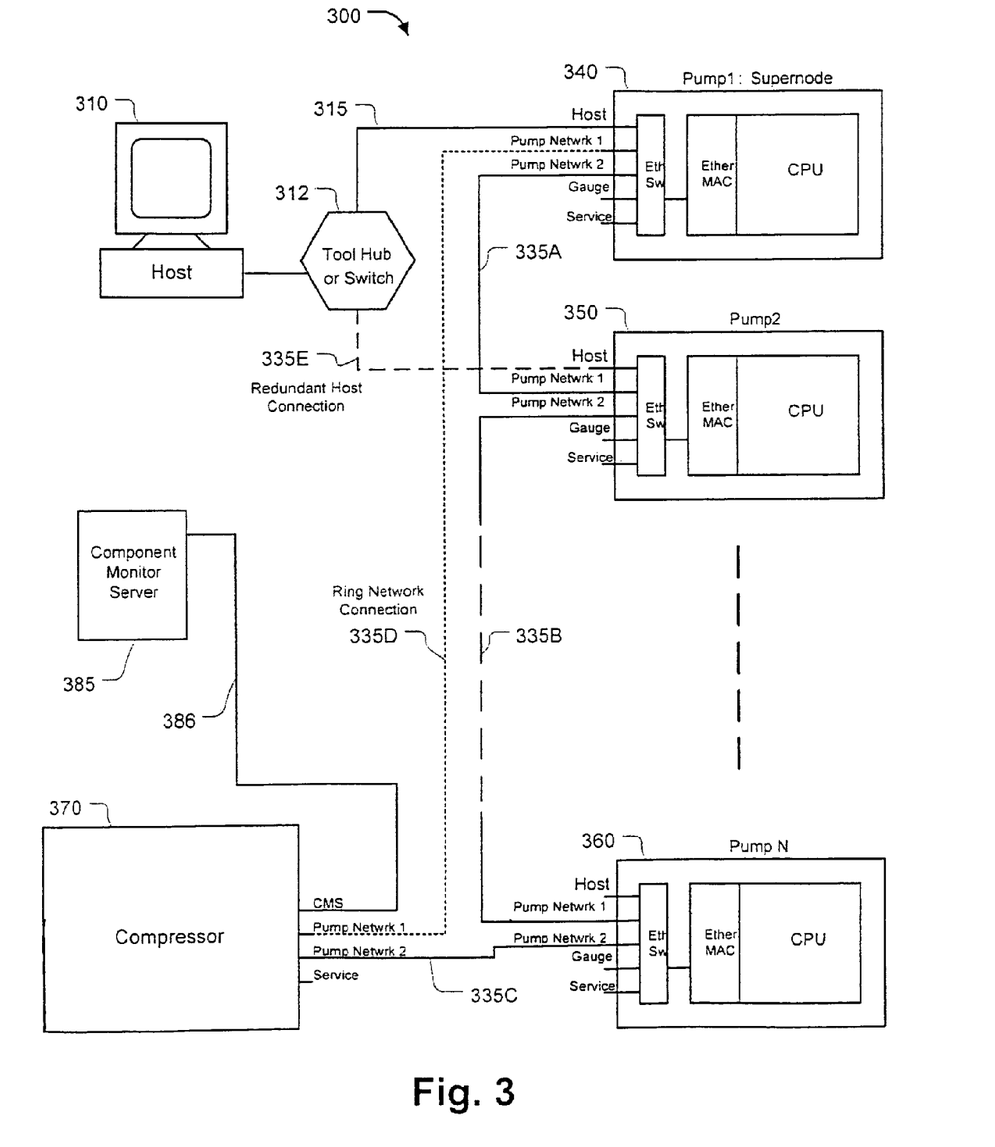
FIG. 3 is a schematic diagram of a vacuum control system having an Ethernet ring configuration, exemplifying an embodiment of the present invention.

FIG. 3 is a schematic diagram of a vacuum control network 300 for a vacuum control system. The network 300 comprises a number of nodes connected as an Ethernet "ring," including a first vacuum pump ("Pump 1") 340, a second vacuum pump ("Pump 2") 350, a third vacuum pump ("Pump N") 360, and a compressor 370. In vacuum applications, each of the vacuum pumps 340, 350, 360 may be a cryopump or a sorption or mechanical roughing pump, the compressor 370 providing a refrigerant (e.g., helium) to each of the cryopumps.

A network host 310 operates as an overall host tool controller. The host 310 provides high level commands to the components at each of the nodes of network 300 in a distributed control configuration. The host 310 communicates with each node on the vacuum control network 300 to monitor and control components and processes at the vacuum pumps 340, 350, 360, compressor 370 and other equipment, such as a waterpump, turbomolecular pump, roughing pump, gauges or vacuum isolation valves, which may comprise additional nodes on the network 300. Communications between the host 310 and a first node of the network 300, Pump1 340, are made via a host network link 315.

The network 300 may comprise an Ethernet physical layer utilizing Transmission Control Protocol and Internet Protocol (TCP/IP) to facilitate inter-node communications between the host 310, cryopumps 340, 350, 360, compressor 370 and other nodes on the network 300. Accordingly, each node includes an Ethernet switch, Ethernet Media Access Control (MAC) and other logic (i.e., central processing unit (CPU)), being a network communications interface, for enabling internode TCP/IP communications. Further, the nodes of the network 300 are connected to enable an Ethernet ring topology: Pump1 340 connects to Pump2 350 via network link (hereinafter referred to as "ring segment") 335A; Pump2 350 connects to PumpN 360 (or one or more intermediary nodes, as illustrated by the dashed line) via network ring segment 335B; Pump N 360 connects to the compressor 370 via network ring segment 335C; and the compressor 370 connects to Pump1 340 via network ring segment 335D. These network ring segments 335A-D connect to one of two Ethernet ports ("Pump Network 1" and "Pump Network 2") at each node, effectively forming a "ring" connecting all of the nodes. Network link 335D is shown as a dotted line to illustrate a disabled redundant link, described further below with reference to FIGS. 4a-b.

Thus, a host 310 utilizes the ring topology of the network 300 to communicate with the vacuum pumps 340, 350, 360, the compressor 370, and other nodes on the network 300 to monitor and provide high level control processes of a vacuum pump system. The host 310 can communicate with vacuum network via Ethernet or the existing RS-232 method. For example, the host may issue communications to initiate group regeneration, individual pump regeneration or helium management, reconfigure the nodes, or exercise isolation valve control at one or more vacuum pumps. Alternatively, such functionality for management and control, referred to as "host functions," may be distributed among the vacuum pumps 340, 350, 360 and compressor 370 as described below with reference to FIG. 7.

Each node may be assigned a local network address (e.g., an IP Address) by the host 310 or autonomously in coordination with the other nodes. The host 310 transmits network communications to the network hub 312 or other network access point, which routes those communications to Pump1 via the host network link 315. Alternatively, the network hub may 312 be omitted, the host 310 connected directly to Pump1 340 or other node. Communications may be routed via a redundant host connection 335E to Pump2 or another node, thereby providing a "backup" communications link in the event that host network link 315 or Pump1 becomes unavailable or disabled. Host communications are then routed between nodes in the Ethernet ring to arrive at the node(s) to which the communications are directed. Further, each node monitors ingress and egress network traffic at its Ethernet ports, thereby providing information for configuring network traffic and fault detection. Example processes by which communications are monitored and propagated through the network 300, and particularly among network nodes comprising an Ethernet ring, are described in further detail below with reference to FIGS. 5a-c and 6.

The compressor 370, or alternatively a vacuum pump or other node, may be configured to communicate with a component monitor server (CMS) 385 via an external network link 386. In such operation, one or more of the nodes, such as the vacuum pumps 340, 350, 360, compressor 370, and gauges provides data relating to its performance, configuration or other characteristics, which in turn indicate status of the vacuum pump system. This data is routed through one of the nodes, such as compressor 370 to the CMS 385, which collects this data for analysis of the vacuum pump system. Based on this analysis, operation of the vacuum pump system can be optimized or diagnosed for faults. An additional redundant link (not shown) from one of the other nodes to the CMS may be used to provide redundant communication to the CMS if the primary link fails.

Figure 4A:
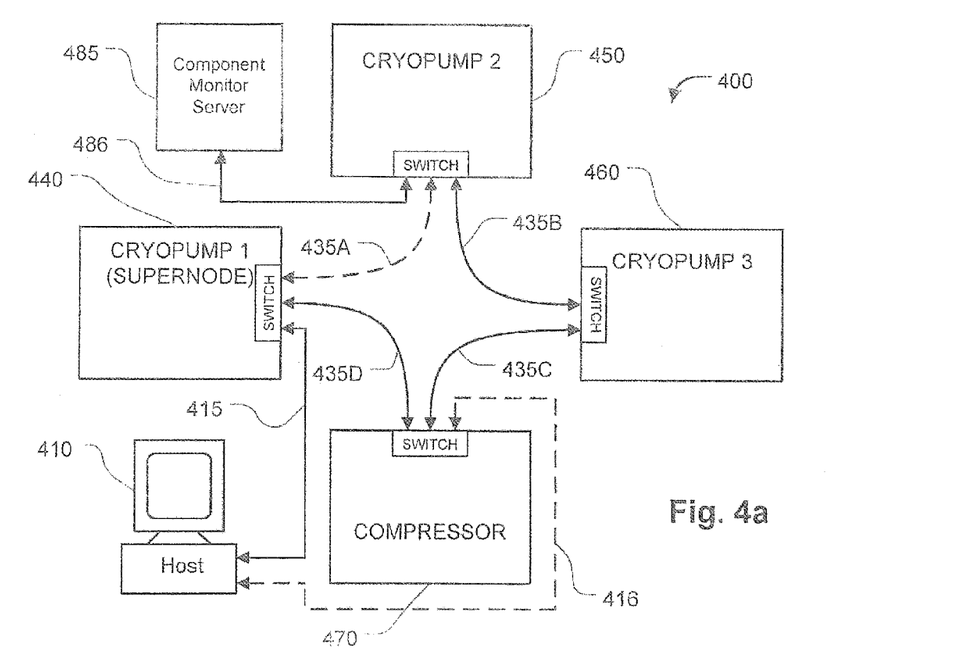
FIGS. 4a-b illustrate a vacuum control system having an Ethernet ring configuration before and during failure of a network ring segment.

FIG. 4a is a block diagram of a vacuum control network 400, which may incorporate features of the network 300 described above with reference to FIG. 3. Cryopump1 440, Cryopump2 450, vacuum pump3 460 and compressor 470 are connected via network ring segments 435A-D to form an Ethernet ring. The host 410 connects to Cryopump1 440 via host network link 415 for propagation of communications through the Ethernet ring. A redundant host network link 416 enables such communications in the event of a fault. Cryopump2 connects via an external network link 485 to a CMS 485. Alternatively, the CMS 485 or redundant host network link 416 may connect with other nodes in the network.

Cryopump1 440 operates as a "supernode" or as a "process master" of the network 400, meaning that it performs additional functions to manage the vacuum network 400 and/or controls processes at the node components 450, 460 and 470. One or more of the nodes 440, 450, 460, 470 may be configured to have the capability of operating as a process master or as a supernode. In a supernode configuration, the host 410 designates a single one of the nodes as the supernode, or the nodes may arbitrate among themselves. As the designated supernode, Cryopump1 440 performs network management, controlling assignment of a disconnect at the network links 435A-D, and controls all or substantially all operational processes of the vacuum control system. Alternatively, in a process master configuration, plural nodes are selected as process master, where each node controls a respective set of processes. The respective sets of processes may be distinct from one another, thereby providing each process master with a different assignment of responsibilities, management and control. In order to accommodate selection of nodes as process masters, some or all of the nodes (e.g., nodes 440, 450, 460, 470) may be configured with the hardware, software and network interface required to exhibit control over any or all of the processes that may be assigned to the plurality of nodes. As a selected process master, for example, Cryopump1 440 may be selected as the process master with respect to network management processes. Providing that all network ring segments 435A-D are operable, upon initialization of the vacuum control network 400, Cryopump1 440 (as a process master or supernode) disables one network ring segment such as 435A by mapping a "virtual disconnect" to the network between the respective nodes (Cryopump1 440 and Cryopump2 450). In doing so, Cryopump1 440 indicates to itself and to Cryopump2 to refrain from transmitting any communications via network ring segment 435. As a result, the remaining network ring segments 435B-D form a network bus through which internode communication and communication with the host 410 is propagated.

Figure 4B:
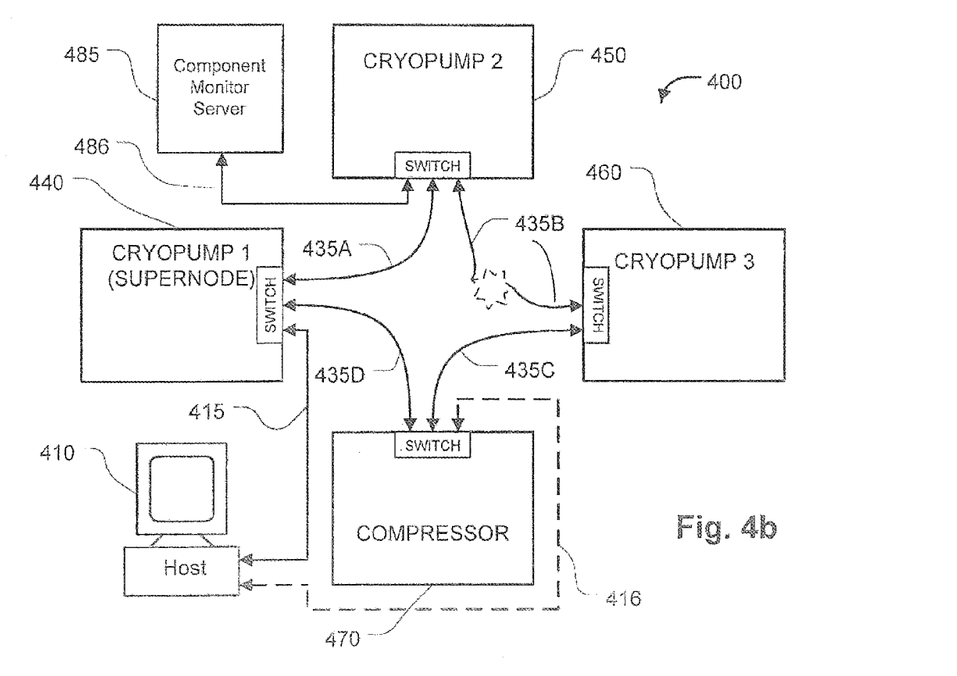

FIG. 4b is a block diagram of the vacuum control network 400 following a fault in a network ring segment. Here, network ring segment 435B becomes disabled, which may be caused by a failure of the physical line connecting the nodes of the networking hardware (e.g., Ethernet switch) at a node or the equipment at the node is removed or completely inoperable. Prior to this fault, Cryopump1 caused network ring segment 435A to be disabled by mapping a virtual disconnect to the segment 435A, as shown in FIG. 4a. Returning to FIG. 4b, it can be seen that the previous disconnect mapped to network ring segment 435A, in addition to the present fault at network ring segment 435B, prevents communication between Cryopump2 450 and other nodes of the network 400.

Vacuum pump3 460 monitors network communications across network ring segments 435B-C, for example by detecting packet error or issuing a periodic ICMP "echo request" and listening for a corresponding "echo response" from other nodes. Vacuum pump3 460 thus detects the disconnect at network ring segment 435B and propagates an error report indicating the location of the disconnect to Cryopump1 440. Alternatively or in addition, Cryopump2 450 may detect the disconnect at network ring segment 435B and transmit a corresponding error report to Cryopump1 440 by enabling network ring segment 435A and transmitting the report across this segment 435A.

Alternatively, embodiments of the invention may employ Spanning Tree Protocol, a communication protocol enabling Ethernet redundancy. In Spanning tree protocol, the root node at Cryopump1 440 transmits topology info to the various switches at nodes Cryopump2 450, vacuum pump3 460 and compressor 470 at a recurring interval (e.g., 2 seconds), and receives a reply indicating if each switch can verify this topology. If not, it makes the appropriate topology changes in its topology table and propagates these changes to the switches. Each of the switches is configured to reply to a received topology as defined under the Spanning Tree algorithm.

In response to the report transmitted by Cryopump2 450, Cryopump1 440 (as a process master or supernode) removes the virtual disconnect at network ring segment 435A and maps a disconnect to network ring segment 435B. In doing so, Cryopump1 440 enables network ring segment 435A by transmitting instructions to Cryopump2 450, via segment 435A, to propagate network packets through network ring segment 435A. Further, Cryopump1 transmits instructions to Cryopump2 450 and Vacuum pump3 460 to disable communications across network ring segment 435B. As a result, the network 400 is reconfigured to continue operation and communication between all nodes in response to a fault in the network 400. Processes at each node with respect to a fault event are described in further detail below with reference to FIGS. 5a-c.

Figure 5A:
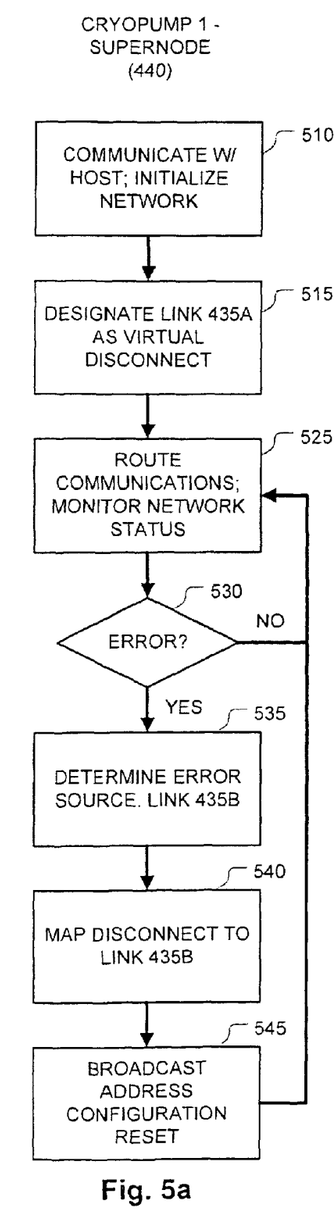
FIGS. 5a-c are flow diagrams illustrating processes at nodes of the vacuum pump system of FIG. 4.

FIG. 5a is a flow diagram illustrating a process that may be employed by Cryopump1 440 of FIGS. 4a-b for initializing the network 400, detecting a fault and recovering from the fault. With reference to FIG. 4a, Cryopump1 440 (as a process master or supernode) communicates with the host 410, from which it may receive instructions relating to initializing and configuring the network 400 and corresponding vacuum control system (510). Such instructions may relate, for example, to operational commands and settings for each of the vacuum pumps 440, 450, 460 and compressor 470 on the network 400, as well as a routine to identify and initialize each of the nodes. Cryopump1 440 may also confirm that each of the network ring segments 435A-D are enabled by broadcasting status indicators across the network 400.

Once it is confirmed that all network ring segments 435A-D are enabled, Cryopump1 designates network ring segment 435A as a virtual disconnect, as described above (515). Accordingly, Cryopump1 routes all inter-node communications through network ring segment 435D, and monitors the status of network link 435D as well as the status of the network 400 (525). In monitoring network status, Cryopump1 440 listens for reports originating at other nodes to detect a fault in the network 400 (530). If a fault is reported, then the location of the fault is determined (535). With reference to FIG. 4b, for example, Cryopump3 460 reports a fault at network ring segment 435B, indicating the location of the fault to Cryopump1 440. Cryopump1 440 enables network ring segment 435A and maps a disconnect to network ring segment 435B (540), thereby enabling a communications bus comprising network ring segments 435A, 435D and 435C.

Prior to mapping the disconnect to network link 435B, however, each of the network nodes may have been configured to route network traffic through particular ports corresponding to a network path to the receiving node. One such method of configuration is described below with reference to FIG. 5c. The enabling and disabling of network ring segments 435B and 435A, respectively, may cause such configurations to be unworkable. Accordingly, Cryopump1 440 broadcasts an "address configuration reset" command to all nodes on the network 400, causing each node to reset routing configurations and reconfigure those settings in view of the reconfigured network 400.

Figure 5B:
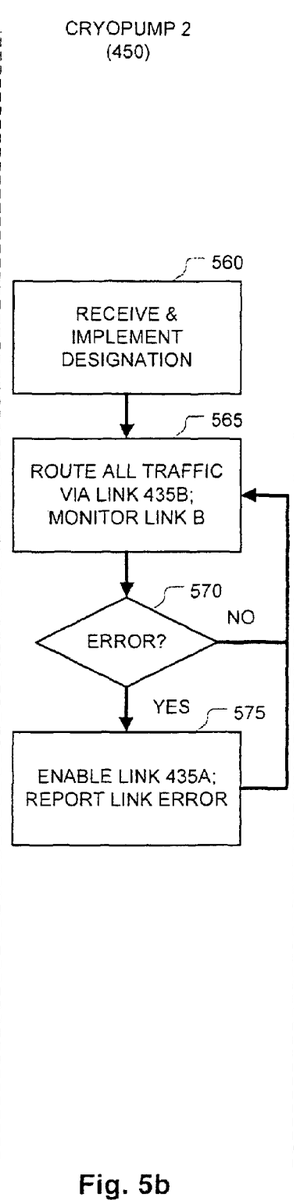

FIG. 5b is a flow diagram illustrating a process that may be employed by Cryopump2 450 of FIGS. 4a-b for configuring and monitoring network traffic at the node. When Cryopump1 440 designates network ring segment 435A as a virtual disconnect (515), Cryopump2 450 receives and implements this designation by disabling traffic through network ring segment 435A (560). Accordingly, all network traffic is routed through network ring segment 435B, and Cryopump2 450 monitors the integrity of network ring segment 435B (565). When Cryopump2 450 detects a fault in the network ring segment 435B, it may enable network ring segment 435A (despite its designation as a virtual disconnect) to report the fault to Cryopump1 440.

Figure 5C:
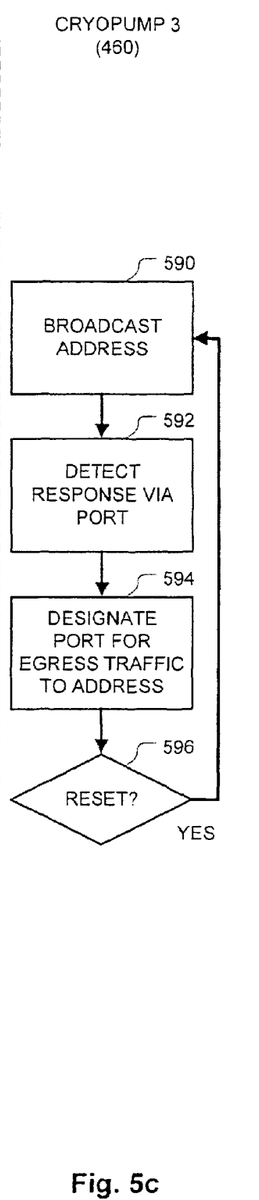

FIG. 5c is a flow diagram illustrating a process that may be employed by Vacuum pump3 460 of FIGS. 4a-b for configuring and reconfiguring network addressing and traffic. This process may be employed by other nodes, such as Cryopump 1 440, Cryopump2 450 and the compressor 470 for determining network traffic settings. Prior to configuration, Vacuum pump3 460 may not have information regarding other nodes in the network 400, including their location, and so may not recognize which network port to utilize for transmitting to a particular node. Thus, Vacuum pump3 460 instead broadcasts the address of a recipient node, such as Cryopump1 440, at both network ports. Because one network ring segment is disabled (e.g., network link 435A), Vacuum pump3 460 will receive a response from the recipient node only at one port (e.g., the port connecting to network link 435C) (592). Vacuum pump3 460 designates this port for transmitting network traffic to the recipient node (594). The above process is repeated for each new recipient address for which a port has not already been designated. In response to a reset command, issued for example by Cryopump1 440 (545), Vacuum pump3 460 resets all such designations (594) and returns to broadcasting the address of each recipient node (590), thereby establishing designated ports in view of a reconfigured network 400.

Figure 6:
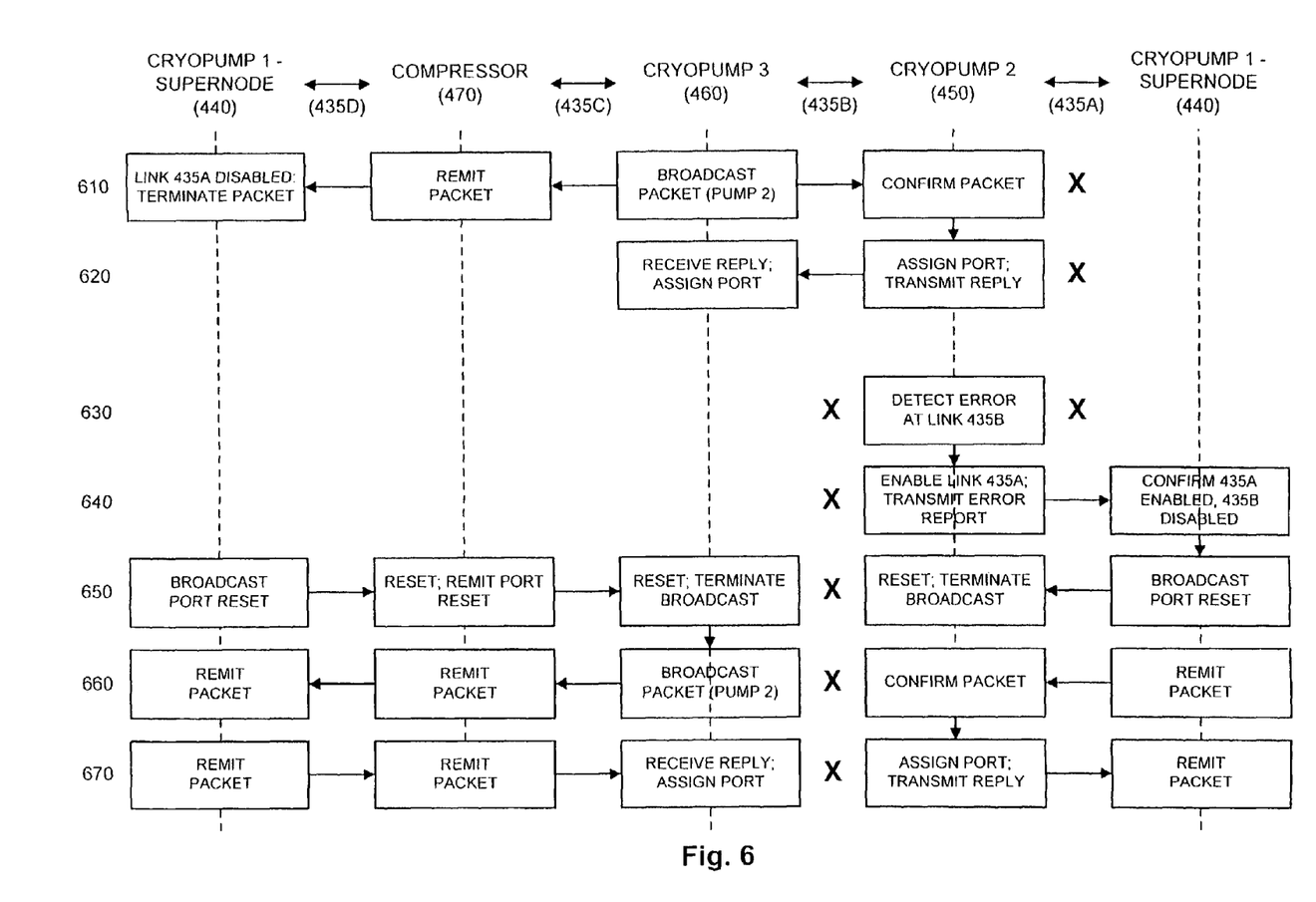
FIG. 6 is a temporal state diagram illustrating processes and communications at and between nodes of the vacuum pump system of FIG. 4.

FIG. 6 is a temporal state diagram illustrating processes and communications at and between nodes of the vacuum control system of FIG. 4, and may incorporate processes described above with reference to FIGS. 5a-c. Cryopump1 440, the supernode, is shown at both the right and the left of the state diagram in order to illustrate its connectivity with both the compressor 470 and Cryopump2 450. At state 610, the network 400 is configured with a virtual disconnect mapped at network link 435A, as shown by the "X" between Cryopump1 440 and Cryopump2 450. In accordance with the process illustrated in FIG. 5c, Vacuum pump3 460 broadcasts a packet addressed to Cryopump2 450. The left-bound packet is propagated across the network 400, where it is terminated at Cryopump1 440 due to the disconnect at ring segment 435A. The right-bound packet is received and confirmed at Cryopump2 450. In response, at state 620 Cryopump2 450 assigns (designates) its left-bound port for communications with Vacuum pump3 460, and transmits a reply to Vacuum pump3 460. Likewise, Vacuum pump3 460 receives the reply and assigns its right-bound port for future communications with Cryopump2 450.

At state 630, Cryopump2 450 detects a fault at network link 435B, as shown by an "X" to its left. At state 640, Cryopump2 enables network link 435A to transmit a fault report to Cryopump1 440. Cryopump1 440 confirms the fault report and reconfigures the network 400 to enable and disable network ring segments 435A and 435B, respectively.

In order to propagate this reconfiguration to all nodes, Cryopump1 440 at state 650 broadcasts an address configuration reset ("port reset") across the network 400, which is confirmed at all other nodes and causes those nodes to reset address port assignments. Thus, at state 660 Vacuum pump3 460 repeats the previous broadcast at state 610, with the exception that network link 435B, rather than link 435A, is disabled. As a result, the broadcast toward Cryopump2 450 is transmitted only at the left-bound port of Vacuum pump3 460. The broadcast packet is remitted across the network 400 to Cryopump2 450, which receives and confirms the packet. At state 670 Cryopump2 450 assigns its right-bound port for communications with Vacuum pump3 460, and transmits a reply to Vacuum pump3 460. Likewise, Vacuum pump3 460 receives the reply and assigns its left-bound port for future communications with Cryopump2 450.

Figure 7:
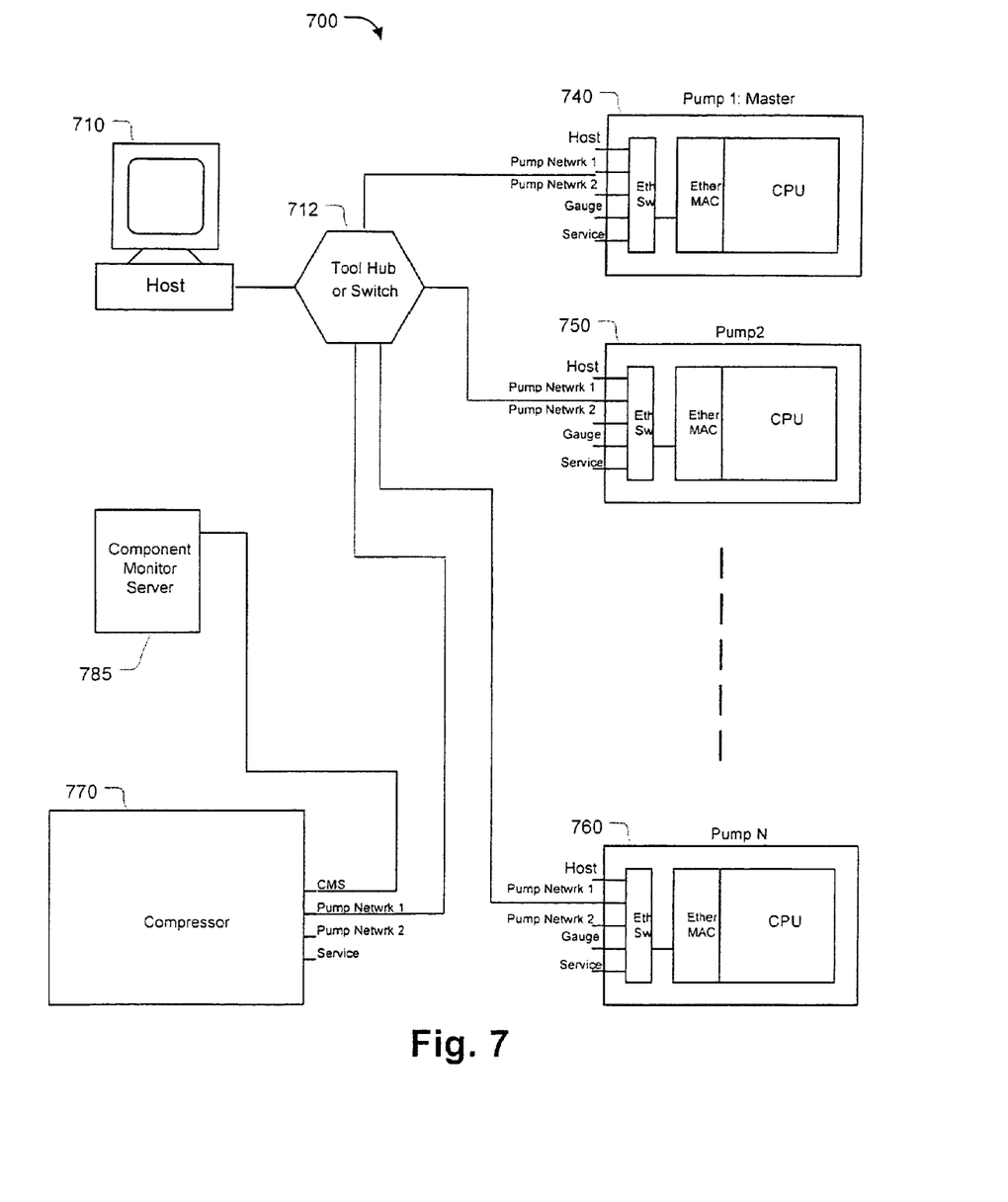
FIG. 7 is a schematic diagram of a vacuum control system having fault tolerance of the nodes in a star topology.

FIG. 7 is a schematic network diagram of a vacuum control system 700 having distributed control functionality and fault tolerant control in a star topology. Cryopump1 740 is designated as a "master" node, being either a process master or a supernode, and is responsive to such commands issued by the host 710 and acts as the vacuum system controller. In a supernode configuration, the designated supernode may be configured to control some or all functional operations at each of the other nodes, including functions at cryopumps, compressors and other vacuum components. For example, the supernode may monitor and control motor speed or temperature at each node, manage helium distribution at a compressor, or may initiate a regeneration process by coordinating regeneration among a plurality of cryopumps. In a process master configuration, operational processes may be distributed among a number of nodes selected to be process masters, where each of the process masters may exhibit control over other nodes in order to manage its respective operational processes. Such operational process can include, for example, communications with a network host, network monitoring and management, helium management, component monitoring and operational data collection, control of safety interlocks, cryopump regeneration, rough and purge stages, and controlling cryopump component interlocks. These and other operational processes of the vacuum control system 700 may be accounted under a set of processes that is distributed among the plural nodes, where each node selected as a process master is assigned a subset of those processes.

Each of the cryopump and other vacuum system components 740, 750, 760 may include logic to operate as a master node (i.e., a process master or supernode), in which case any of the vacuum components 740, 750, 760 may be designated as a master of one or more operational processes or may assume control of such processes in response to a previously designated cryopump or vacuum system component becoming unavailable or faulty. If such a node becoming unavailable is a supernode, then another cryopump may be selected to become the supernode. During both initialization of the network and in response to a fault, selection of a supernode or assignment of processes to plural process masters may be controlled by a network host 710, or may be completed by arbitration among the plural nodes 740, 750, 760, 770. The vacuum control network software will recognize the loss of the controller and reassign a new node as a process master or supernode for vacuum network controller. Control of the vacuum network or operational processes may be passed from Cryopump1 740 to vacuum pump3 760 when the fault or removal of Cryopump1 is detected on the network. Methods of determining loss of a master node may include the nodes loss of detection of pinging by the master or loss of response by the master to pings sent by the nodes and transferring the "master" node function to the next in line on the hierarchy table with an autoupdate of the table of components and status.

Cryopump1 740 includes hardware and software to act as the vacuum system controller for performing a number of processes in response to instructions from the host 710. In some such processes, each cryopump and compressor may be configured for performing those processes in response to high-level instructions from the host 710, meaning that each cryopump and compressor node may be selectable as a process master for any of a number of operational processes. For example, Cryopump2 750 and Compressor 770 may be configured in a manner similar to Cryopump1 740 as described above, thereby being selectable as a process master. In other system processes, particularly those requiring coordination among multiple system components (i.e., cryopumps and compressors), a "master" node (comprising a cryopump, compressor or other vacuum system component) may control processes at the other system components to complete the process. For example, Cryopump1 740; as a supernode or as a process master for regeneration processes, may receive instructions to perform a group regeneration in order to evaporate trapped gasses at the cryopanels of each of the cryopumps 740, 750, 760. To optimize regeneration, Cryopump1 740 controls the other cryopumps 750, 760 to coordinate phases of regeneration among the cryopumps 740, 750, 760. In particular, during an initial, or "rough" phase of regeneration, Cryopump1 740 may enable access to a rough manifold (not shown) for all cryopumps 740, 750, 760 simultaneously. Once the initial phase is complete, Cryopump1 740 may prevent multiple cryopumps from accessing the rough manifold, instead enabling access for one cryopump at a time in an alternating sequence, thereby preventing cross-contamination of gases among multiple cryopumps.

Similarly, the compressor 770 is configured to perform some functions autonomously or in response to instructions provided by the host 710 or Cryopump1 740 (the process master or supernode), rather than being directly controlled by the host 710. For example, the compressor can be configured as a process master for helium management, managing helium supply to each of the cryopumps 740, 750, 760 by monitoring helium pressure and operational requirements at each of the cryopumps. The helium management may be accomplished by communicating with each cryopump via the network, measuring helium pressure via sensors, or both. Based on this monitoring, the compressor 770 may increase or decrease helium allocation to each cryopump accordingly. The compressor can also collect operational data, as described above, for transmission to a component monitor server 785.

The vacuum control system 700 as shown is configured as a centralized network, where each of the nodes (i.e., cryopumps 740, 750, 760 and compressor 770) connect to a central network hub 712 for communication among the nodes and with the host 710. Alternatively, the system 700 may be configured as an Ethernet ring network, such a the network 300 described above with reference to FIG. 3. Such a configuration could enable a simplified network topology and recovery from network failure, while also distribution functionality among the vacuum control system components.

While this invention has been particularly shown and described with references to example embodiments thereof, it will be understood by those skilled in the art that various changes in form and details may be made therein without departing from the scope of the invention encompassed by the appended claims.

What is claimed is:

1. A vacuum control network system having a plurality of nodes, the system comprising:
   a first node comprising a first cryopump and a first network communications interface; and
   a second node comprising a second network communications interface, the second node configured to control processes at the first cryopump;
   wherein the second node further comprises a second cryopump, and the first node is configured to control processes at the first and second cryopumps; and
   wherein each of the plurality of nodes in the network is configured to control processes at other nodes of the network and is selectable as a master.

2. The system of claim 1, further comprising a network host, the network host configured to select one of the first and second nodes as a master.

3. The system of claim 2, wherein the network host, upon detecting a failure at the master node, designates another of the first and second nodes as the master node.

4. The system of claim 1, wherein each of the plurality of nodes arbitrate with one another to select a master.

5. The system of claim 1, wherein a single node is selected as a master, the master being a supernode.

6. The system of claim 5, wherein, upon detecting a fault at the supernode, other nodes of the plurality of nodes arbitrate with one another to select a successive supernode.

7. The system of claim 1, wherein plural nodes are selectable as process masters.

8. The system of claim 7, wherein the first and second nodes are selected as process masters, the first node controlling a first set of processes associated with the first and second cryopumps, the second node controlling a second set processes associated with the first and second cryopumps, the first set including at least one process that is distinct from the second set.

9. The system of claim 8, wherein each of the first and second sets of processes includes one or more of: communications with a network host, network management, helium management, component monitoring and operational data collection, control of safety interlocks, cryopump regeneration, rough and purge stages, and controlling cryopump component interlocks.

10. The system of claim 8, further comprising a network host, the network host configured to assign processes to the first and second sets of processes.

11. The system of claim 8, wherein the first and second nodes are configured to communicate with one another to assign processes to the first and second sets of processes.

12. The system of claim 11, wherein said nodes communicate responsive to receiving, at one or both of the first and second nodes, a third set of processes to be distributed among the plurality of nodes.

13. The system of claim 12, wherein both the first and second nodes are configured to include capability to complete all processes of the third set.

14. The system of claim 12, further comprising a third node having a third network interface, the third set of processes being distributed among the plurality of nodes including the third node.

15. The system of claim 14, wherein the third node, upon detecting a failure of the first node, is configured to control at least one process of the first set of processes.

16. The system of claim 14, wherein the third node further comprises a compressor.

17. The system of claim 8, wherein the first node, upon detecting a failure of the second node, is configured to import at least one process of the second set into the first set to control the at least one process of the second set.

18. The system of claim 1, further comprising:
network ring segments between node pairs forming a ring with the plurality of nodes; and
a network controller configured to determine a fault at the network ring segments and control enabling and disabling of the network ring segments.

19. The system of claim 18, wherein the network controller is configured to disable one of the network ring segments independent of integrity of the network ring segment or associated node.

20. The system of claim 19, wherein the plurality of nodes are configured to communicate via a bus formed by the network ring segments that are enabled.

21. The system of claim 19, wherein the network controller, in response to receiving an error report indicating a faulty network ring segment, enables the disabled network ring segment and disables the faulty network ring segment.

* * * * *